United States Patent Office 3,535,082
Patented Oct. 20, 1970

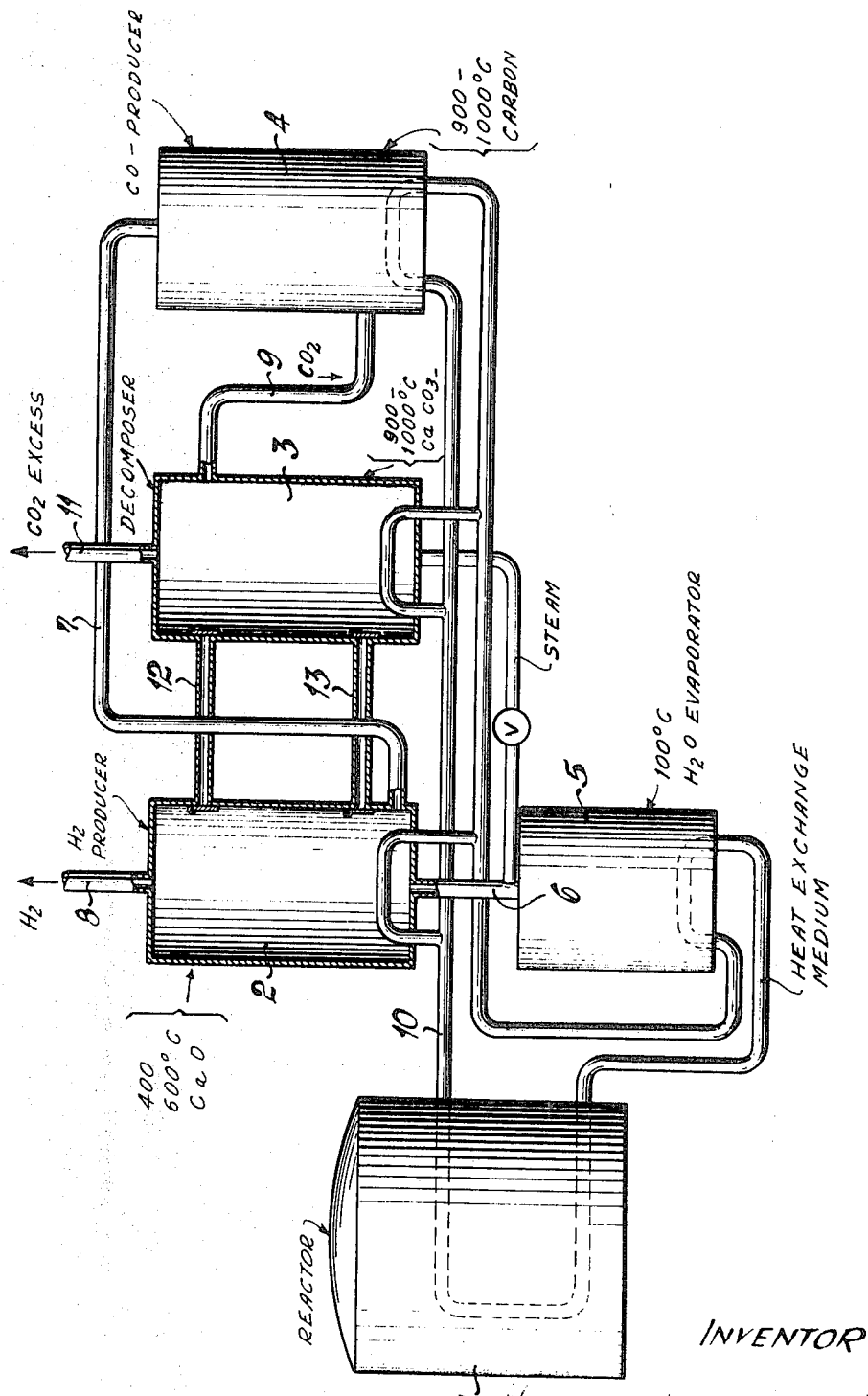

3,535,082
METHOD FOR UTILIZING NUCLEAR ENERGY IN THE PRODUCTION OF HYDROGEN
Hans Wolfgang Nurnberg and Gerhard Wolff, Julich, Germany, assignors to Kernforschungsanlage Julich G.m.b.H., Julich, Germany
Filed Feb. 15, 1968, Ser. No. 705,756
Claims priority, application Germany, Feb. 17, 1967, K 61,456
Int. Cl. C01b 1/00
U.S. Cl. 23—212                                    5 Claims

ABSTRACT OF THE DISCLOSURE

Nuclear energy is utilized in the production of hydrogen by heating calcium or magnesium carbonate so as to form the respective metal oxide and carbon dioxide, using a portion of the thus obtained carbon dioxide for conversion thereof in contact with carbon to carbon monoxide, heating the thus obtained metal oxide and carbon monoxide in the presence of steam so as to form hydrogen gas and metal carbonate, the latter being reused for producing metal oxide and carbon dioxide and the hydrogen gas being recovered, and supplying the heat required for these reactions and for the production of the needed steam by indirect heat exchange with a heat exchange medium such as helium which passes in a closed cycle between a high temperature nuclear reactor in which the heat exchange medium is heated and the above described reaction mixtures which are heated by the heat exchange medium under simultaneously cooling of the latter.

BACKGROUND OF THE INVENTION

The present invention is concerned with a method and arrangement for producing in an endothermic system hydrogen gas whereby the required heat is supplied by a high temperature nuclear reactor.

Generally, the energy produced in such nuclear reactors is utilized by being converted into electric current. Frequently, the energy which is freed by fission of the nuclear fuel and to a large extent converted into heat is withdrawn by means of a cooling agent flowing through a tubular system in the reactor, and utilized by indirect heat exchange. In the heat exchanger, the heat taken up by the cooling agent is transferred to another medium, generally steam, which then is used in conventional manner for producing electric energy. The above described conversion represents by no means a highly effective or economical utilization of the energy produced in the nuclear reactor. It has been attempted to increase the efficiency of the nuclear reactor, however, the disadvantage of having to convert the nuclear energy into electric energy before arriving at the final use remains.

It is therefore an object of the present invention to achieve a more direct and more economical utilization of energy produced in a high temperature nuclear reactor.

SUMMARY OF THE INVENTION

The present invention proposes to utilize the energy produced in a high temperature nuclear reactor for the production of hydrogen gas by heating in a first stage a metal carbonate to a temperature sufficiently high to decompose the metal carbonate under formation of the corresponding metal oxide and carbon dioxide, passing in a second stage a portion of the thus formed carbon dioxide through a mass of carbonaceous material at a temperature sufficiently high to react said carbon dioxide with the carbonaceous material under formation of carbon monoxide, heating at a third stage the thus obtained metal oxide and carbon monoxide in the presence of steam at a temperature sufficiently high to form hydrogen gas and metal carbonate by reaction of the metal oxide, carbon monoxide and steam, the thus formed metal carbonate serving for subsequent decomposition to metal oxide and carbon dioxide, recovering the thus formed hydrogen gas, and supplying the heat required for the decomposing of said metal carbonate, converting said carbon dioxide, reacting said metal oxide with carbon monoxide and steam, and for producing the steam in a fourth stage, by pssing a heat exchange medium in closed cycle in indirect heat exchange through a high temperature nuclear reactor so as to heat the heat exchange medium, and passing the thus heated heat exchange medium in indirect heat exchange contact through the four stages thereby supplying the heat required at the four stages and cooling said heat exchange medium, and reintroducing the thus cooled heat exchange medium into the high temperature nuclear reactor.

Preferably, the heat exchange medium will be helium and the metal carbonate either calcium carbonate or magnesium carbonate.

The present invention also contemplates an arrangement for carrying out the above described method, which arrangement comprises a high temperature nuclear reactor, a first reaction vessel for heating a metal carbonate so as to decompose the same into metal oxide and carbon dioxide, and for subsequently reacting the thus formed metal oxide with steam and carbon monoxide to form hydrogen gas and metal carbonate, a second reaction vessel for reacting carbonaceous material with carbon dioxide so as to form carbon monoxide, first conduit means for passing carbon dioxide from the first reaction vessel to the second reaction vessel, a third reaction vessel for heating metal oxide, carbon monoxide and steam so as to form hydrogen gas and metal carbonate, and for subsequently heating thus formed metal carbonate so as to decompose the same into metal oxide and carbon dioxide, second conduit means for passing carbon dioxide from the third reaction vessel to the second reaction vessel, withdrawal means for alternatingly withdrawing hydrogen gas from the first and third reaction vessel, respectively, heating means for producing steam, conduit means for alternatingly introducing steam from said heating means into the first and third reaction vessel, and fourth conduit means for conveying in a closed cycle a fluid heat exchange medium through the nuclear reactor thereby heating the heat exchange medium, and through the first, second and third reaction vessel and the heating means, and thereby cooling the heat exchange medium, and for reintroducing thus cooled heat exchange medium into the nuclear reactor.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

The single figure of the drawing is a schematic elevational illustration, in the nature of a flow sheet, of an arrangement according to the present invention.

DESCRIPTION OF THE PREFERRED EMBODIMENTS

According to the present invention, the energy which is produced in the core of a nuclear reactor is conveyed in conventional manner to a cooling or heat exchange medium passing in a system of conduits or pipes through the nuclear reactor. The thus heated cooling or heat exchange medium is then passed in a closed cycle through various reaction vessels in which certain chemical reactions with an endothermic heat balance are carried out.

The required temperature and heat for carrying out these reactions is supplied by the heat exchange medium which is cooled thereby and which flows in thus cooled condition back into the nuclear reactor to be again heated therein and recycled.

It is particularly advantageous to produce hydrogen gas in this manner.

By supplying the heat requirements above a certain temperature which depends on the specific metal oxide utilized in the production of hydrogen, the equilibrium of the reaction (I) $\quad 2CO + 2H_2O + 2MeO \rightleftarrows 2MeCO_3 + 2H_2$ is transferred towards the right-hand side of Equation I.

The metal carbonate which is formed thereby decomposes at a temperature above a certain minimum temperature which again depends of the specific metal carbonate and upon supply of the required heat energy in accordance with the following equation:

(II) $\quad 2MeCO_3 \rightleftarrows 2MeO + 2CO_2$

Furthermore, at temperatures of between about 900° C. and 1000° C., carbon dioxide will react with carbon under the formation of carbon monoxide in accordance with the following equation:

(III) $\quad CO_2 + C \rightleftarrows 2CO$

Keeping the foregoing in mind, the heat exchange medium leaving the nuclear reactor is passed in indirect heat exchange through a reaction vessel which holds a suitable metal oxide, preferably calcium oxide or magnesium oxide in granular form and through which flows a mixture of steam and carbon monoxide. Due to the temperature and heat supplied in the reaction vessel in indirect heat exchange with the heat exchange medium, reaction will take place, forming the respective metal carbonate and freeing hydrogen gas.

The thus formed metal carbonate is then decomposed into carbon dioxide and metal oxide, again utilizing heat supplied by indirect heat exchange with the heat exchange medium. A portion of the thus formed carbon dioxide is withdrawn or allowed to escape, however, another portion thereof is passed through a zone of the reaction vessel or through a separate reaction vessel which holds carbon or carbonaceous material, for instance, in the form of screened coke of medium particle size, such as between about 30 and 50 millimeters. This zone or reaction vessel is again heated in indirect heat exchange with the heat exchange medium to a temperature sufficiently high to cause reaction between the carbon dioxide and the carbonaceous material under formation of carbon monoxide.

Helium is a preferred heat exchange medium for taking up heat in the nuclear reactor and supplying heat to the various reactions described above.

Considering these reactions, the energy balance for the method of producing hydrogen gas described above will show that one mol carbon is consumed for producing two mols hydrogen. This corresponds to an energy gain of 20% since for each 1000 kcal. of combustion heat of the carbon an amount of hydrogen gas is produced which corresponds to a heat equivalent of 1200 kcal. Thus, by proceeding in accordance with the present invention, the energy produced by the reactor and conveyed to the heat exchange medium will be directly converted into the heat of formation of the thus produced hydrogen or, in other words, the energy produced in the nuclear reactor is converted, with interposition of the heat exchange medium, into chemical energy. It is thus a very significant effect of the present invention that the relatively inexpensive heat energy of the nuclear reactor is directly converted into chemical energy.

Referring now to the drawing, heat produced in nuclear reactor 1 is taken up by helium as the heat exchange medium circulating through conduit 10. It will be seen that conduit 10, in part, passes through reaction vessel 2 in which hydrogen gas is produced, then through reaction vessel 3 in which calcium carbonate is decomposed, and then through reaction vessel 4 in which carbon monoxide is formed. The respectively required amount of heat and the temperatures needed in the respective reaction vessels can be easily adjusted by conventional valve and control means or other suitable devices known to those skilled in the art and not shown in the drawing.

Furthermore, conduit 10 also passes through evaporator or boiler 5 in which the steam is formed, which is required for producing hydrogen. Boiler 5 communicates with reaction vessel 2 by means of valve controlled conduit 6. A branch of conduit 6 leads to reaction vessel 3 so that the reactions described as taking place in reaction vessels 2 and 3 may be reversed. In other words, the calcium oxide which is converted in reaction vessel 2 into calcium carbonate may be retained therein for subsequent decomposition into calcium oxide and carbon dioxide; and the calcium oxide which is formed in reaction vessel 3 may be retained therein and used in combination with carbon monoxide and steam for producing hydrogen gas.

A conduit 7 connects reaction vessel 4 in which carbon monoxide is produced with reaction vessel 2. Hydrogen gas formed in reaction vessel 2 is withdrawn from the upper portion thereof through conduit 8.

Since, as illustrated, reaction vessel 3 communicates with reaction vessel 4 by means of conduit 9, it is possible to circulate the carbon dioxide formed by the decomposition of calcium carbonate after reduction in reaction vessel 4 in the form of carbon monoxide into reaction vessel 2 in which, according to the illustrated embodiment, hydrogen gas is formed. The excess $CO_2$ formed upon decomposition of calcium carbonate is withdrawn from the upper portion of reaction vessel 3 by means of conduit 11.

In order to make it possible to carry out the production of hydrogen gas in accordance with the present invention in a continuous manner, reaction vessels 2 and 3 are interconnected by means of conduits 12 and 13, each of which may be opened and closed and with evaporator 5 so that in each of reaction vessels 2 and 3 alternatingly either hydrogen gas may be produced or calcium carbonate decomposed.

It is of course also within the scope of the present invention to carry out the method described hereinabove in a single reaction vessel divided into several zones and to control the temperature in each of the zones at any given time so as to be best suited for the respective reactions to be carried out in such zone at such time.

It is a great advantage of the present method and the illustrated arrangement that hydrogen gas may be produced in an effective, economical and continuous manner and so that hydrogen gas will be the main product obtained. The only other product obtained will be a portion of the carbon dioxide produced by decomposition of calcium carbonate.

It will also be noted that calcium carbonate is converted into calcium oxide and again reconverted to calcium carbonate so that there is substantially no loss of calcium carbonate and the only raw materials which are used up during the process are steam and the carbonaceous material utilized in reaction vessel 4 for converting carbon dioxide into carbon monoxide.

As a rough approximation, it may be stated that the method of the present invention converts:

(IV) $\quad 2H_2O + C \rightarrow CO_2 + 2H_2$

The following examples are given as illustrative only without, however, limiting the invention to the specific details of the examples.

EXAMPLE 1

In a model arrangement, a stream of helium gas was passed through a simulated high temperature nuclear reactor. The helium gas was contained in a closed tubular circuit capable of conveying up to 10 grams of helium gas per second. The gas left the oven at a temperature of about 1000° C. and returned after passing through the various reaction vessels as shown in the drawing, and was returned at a temperature of between 880° and 900° C. into the oven for being heated therein to about 1000° C. One kilogram calcium oxide in the form of granules having a particle size between 5 and 10 millimeters were introduced into reaction vessel 2 and reacted at a temperature of 550° C. and an absolute pressure of 1.5 atmospheres with 500 grams carbon monoxide and 320 grams steam. The reaction was 82% complete and released 700 kcal. which were taken up by cooling water contacting the outer face of reaction vessel 2.

In order to start the reaction, the reaction vessel had to be preheated to about 600° C. and this preheating was carried out with hot helium circulating through conduit 10. The loop of conduit 10 which passes through reaction vessel 2 could and was shut off after the above described reaction had been initiated. After completion of the reaction, and operation of suitable valves or the like, a similar reaction was carried out in reaction vessel 3 under the same conditions. In the meantime, reaction vessel 2 was again heated by passage of hot helium gas through the loop of conduit 10 passing through reaction vessel 2 so as to obtain in reaction vessel 2 a temperature of between 900° and 1000° C. at which calcium carbonate was decomposed into calcium oxide and carbon dioxide. Thereby 790 kcal. were consumed and the temperature of the helium flowing at a rate of about 6.5 grams per second dropped by about 100° C.

About 70% of the thus formed carbon dioxide was conveyed into reaction vessel 4. Reaction vessel 4 had been charged with screened coke having a particle size between 30 and 50 milligrams and was permanently maintained at a temperature between 800° and 1000° C. by the passage of hot helium into the loop of conduit 10 located in reaction vessel 4. This was accomplished by passing hot helium at a rate of about 3.5 grams per second through the portion of conduit 10 located in reaction vessel 4.

The carbon monoxide was formed in reaction vessel 4 in accordance with the equation:

(V) 
$$CO_2 + C \rightleftharpoons 2CO$$

The thus formed CO was alternatingly introduced into reaction vessels 2 and 3, i.e. into the reaction vessel in which hydrogen was freed.

During the entire duration of the process, water was heated in reaction vessel 5 to form steam which alternately was conveyed to reaction vessel 2 or 3, i.e. to the reaction vessel in which at the respective time hydrogen gas was freed. The temperature of the helium flowing through the portion of conduit 10 located in boiler 5 at a rate of 10 grams per second dropped by 20° C. and the thus cooled helium was then recycled into the oven for being again heated to about 1000° C.

EXAMPLE 2

The process described in Example 1 was substantially repeated, however, calcium oxide was replaced with magnesium oxide. In this case a temperature of between 700° and 800° C. was sufficient for causing practically complete decomposition of magnesium carbonate to magnesium oxide and carbon dioxide.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A method of utilizing heat energy produced in a high temperature nuclear reactor for the production of hydrogen gas, comprising the steps of heating in a first stage a metal carbonate to a temperature sufficiently high to decompose said metal carbonate under formation of the corresponding metal oxide and carbon dioxide; passing in a second stage a portion of the thus formed carbon dioxide through a mass of carbonaceous material at a temperature sufficiently high to react said carbon dioxide with said carbonaceous material under formation of carbon monoxide; heating at a third stage thus obtained metal oxide and carbon monoxide in the presence of steam at a temperature sufficiently high to form hydrogen gas and metal carbonate by reaction of said metal oxide, carbon monoxide and steam, the thus formed metal carbonate serving for subsequent decomposition to metal oxide and carbon dioxide; recovering the thus formed hydrogen gas; and supplying the heat required for said decomposing of said metal carbonate, converting said carbon dioxide, reacting said metal oxide with carbon monoxide and steam, and for producing in a fourth stage said steam, by passing a heat exchange medium in a closed cycle in indirect heat exchange through a high temperature nuclear reactor so as to heat said heat exchange medium, and passing the thus heated heat exchange medium in indirect heat exchange contact through said four stages thereby supplying the heat required at said four stages and cooling said heat exchange medium, and reintroducing the thus cooled heat exchange medium into said high temperature nuclear reactor.

2. A method as defined in claim 1, wherein said heat exchange medium is helium.

3. A method as defined in claim 1, wherein said metal carbonate is selected from the group consisting of calcium carbonate and magnesium carbonate.

4. A method as defined in claim 3, wherein said metal carbonate is calcium carbonate.

5. A method as defined in claim 3, wherein said metal carbonate is magnesium carbonate.

References Cited

UNITED STATES PATENTS

| | | | |
|---|---|---|---|
| 1,793,677 | 2/1931 | Casale | 23—212 |
| 1,926,587 | 9/1933 | Hansgirg | 23—212 |
| 3,355,249 | 11/1967 | Squires | 23—213 |
| 3,397,962 | 8/1968 | Squires | 23—213 |

EDWARD STERN, Primary Examiner

U.S. Cl. X.R.

23—1, 66, 67, 150, 204, 213, 260